United States Patent
Kim et al.

(10) Patent No.: US 9,727,156 B2
(45) Date of Patent: Aug. 8, 2017

(54) METHOD FOR RECOGNIZING BIOMETRICS INFORMATION AND ELECTRONIC DEVICE THEREOF

(71) Applicant: Samsung Electronics Co., Ltd., Suwon-si, Gyeonggi-do (KR)

(72) Inventors: Ki-Bong Kim, Daegu (KR); Kyoung-Ok Kim, Gumi-si (KR); Hyeon-Ho Kim, Gumi-si (KR); Hyo-Jin Son, Daegu (KR); Yeun-Wook Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/626,074

(22) Filed: Feb. 19, 2015

(65) Prior Publication Data
US 2015/0242696 A1 Aug. 27, 2015

(30) Foreign Application Priority Data
Feb. 21, 2014 (KR) .................. 10-2014-0020864

(51) Int. Cl.
*G06K 9/00* (2006.01)
*G06F 3/041* (2006.01)

(52) U.S. Cl.
CPC .......... *G06F 3/0412* (2013.01); *G06F 3/0416* (2013.01); *G06K 9/00013* (2013.01); *G06K 9/00604* (2013.01); *G06K 9/00912* (2013.01)

(58) Field of Classification Search
CPC ........... G06K 9/00026; G06K 9/00006; G06K 9/00013; G06K 9/00033
See application file for complete search history.

(56) References Cited

U.S. PATENT DOCUMENTS

| | | | |
|---|---|---|---|
| 8,279,182 B2 | 10/2012 | Kim et al. | |
| 8,605,960 B2 * | 12/2013 | Orsley | G06F 3/0421 382/124 |
| 8,638,994 B2 * | 1/2014 | Kraemer | G06K 9/00013 382/119 |
| 9,158,410 B2 * | 10/2015 | Hare | G06F 3/0416 |
| 9,301,140 B1 * | 3/2016 | Costigan | H04W 12/06 |
| 2010/0220900 A1 | 9/2010 | Orsley | |
| 2010/0225443 A1 * | 9/2010 | Bayram | G06F 21/316 340/5.83 |
| 2012/0269406 A1 * | 10/2012 | Kraemer | G06K 9/00013 382/124 |
| 2015/0086090 A1 * | 3/2015 | Jung | G06K 9/00087 382/124 |
| 2015/0131876 A1 * | 5/2015 | Chang | G06K 9/00013 382/124 |
| 2016/0246396 A1 * | 8/2016 | Dickinson | G06F 3/03545 |
| 2016/0283772 A1 * | 9/2016 | Nelson | G06F 3/0421 |
| 2016/0350522 A1 * | 12/2016 | Chi | G06F 3/0412 |
| 2016/0371691 A1 * | 12/2016 | Kang | G06F 3/04842 |

FOREIGN PATENT DOCUMENTS

| | | | |
|---|---|---|---|
| JP | 2009-178300 A | | 8/2009 |
| KR | 10-2008-0000481 A | | 1/2008 |

* cited by examiner

*Primary Examiner* — Wesley Tucker
(74) *Attorney, Agent, or Firm* — Jefferson IP Law, LLP

(57) ABSTRACT

An apparatus and a method for recognizing bio-data in an electronic device are provided. The method includes detecting an input via a sensor module, outputting guide information for bio-data recognition corresponding to the detected input, and detecting bio-data by using a bio-data detecting module.

13 Claims, 17 Drawing Sheets

METHOD FOR RECOGNIZING BIOMETRICS INFORMATION AND ELECTRONIC DEVICE THEREOF

CROSS-REFERENCE TO RELATED APPLICATION(S)

This application claims the benefit under 35 U.S.C. §119 (a) of a Korean patent application filed on Feb. 21, 2014 in the Korean Intellectual Property Office and assigned Serial number 10-2014-0020864, the entire disclosure of which is hereby incorporated by reference.

TECHNICAL FIELD

The present disclosure relates to an apparatus and method for recognizing bio-data in an electronic device.

BACKGROUND

With the advancement of information communication techniques and semiconductor, various electronic devices are under development as multimedia devices for providing various multimedia services. For example, the electronic device may provide a multimedia service such as a voice telephony service, a video telephony service, a messenger service, a broadcast service, a wireless Internet service, a camera service, and a music play service.

Since the electronic device stores user's personal information, a security function may be provided to prevent other users from using the electronic device indiscriminately. For example, the electronic device may provide a biometrics service, which performs user authentication by using user-specific bio-data such as a user's fingerprint, face, voice, retina, and iris.

The above information is presented as background information only to assist with an understanding of the present disclosure. No determination has been made, and no assertion is made, as to whether any of the above might be applicable as prior art with regard to the present disclosure.

SUMMARY

When the biometrics service is provided, the electronic device may request a user a specific behavior for recognizing user's bio-data. For example, if a fingerprint recognition service is provided, the electronic device may request to directly input a user's fingerprint information to a finger recognition sensor. For another example, if an iris recognition service is provided, the electronic device may request to put a user's eye close to an iris recognition sensor for the user. If the user of the electronic device fails to correctly recognize a method (e.g., a specific behavior) for biometrics, a bio-data recognition rate of the electronic device may deteriorate.

Aspects of the present disclosure are to address at least the above-mentioned problems and/or disadvantages and to provide at least the advantages described below. Accordingly, an aspect of the present disclosure is to provide an apparatus and method for recognizing user's bio-data in an electronic device.

Another aspect of the present disclosure is to provide an apparatus and method for providing a bio-data recognition means to a user in an electronic device.

Another aspect of the present disclosure is to provide an apparatus and method for providing a bio-data recognition means to a user by using a bio-data detecting sensor and other sensors in an electronic device.

In accordance with an aspect of the present disclosure, a method of operating an electronic device is provided. The method includes detecting an input via a sensor module, outputting guide information for bio-data recognition corresponding to the input, and detecting bio-data by using a bio-data detecting module in response to an output of the guide information.

In accordance with an aspect of the present disclosure, an electronic device is provided. The electronic device includes a sensor module, a bio-data detecting module configured to detect bio-data, and at least one processor. The processor is configured to output guide information for bio-data recognition corresponding to an input detected by using the sensor module, and to detect the bio-data by using the bio-data detecting module in response to an output of the guide information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
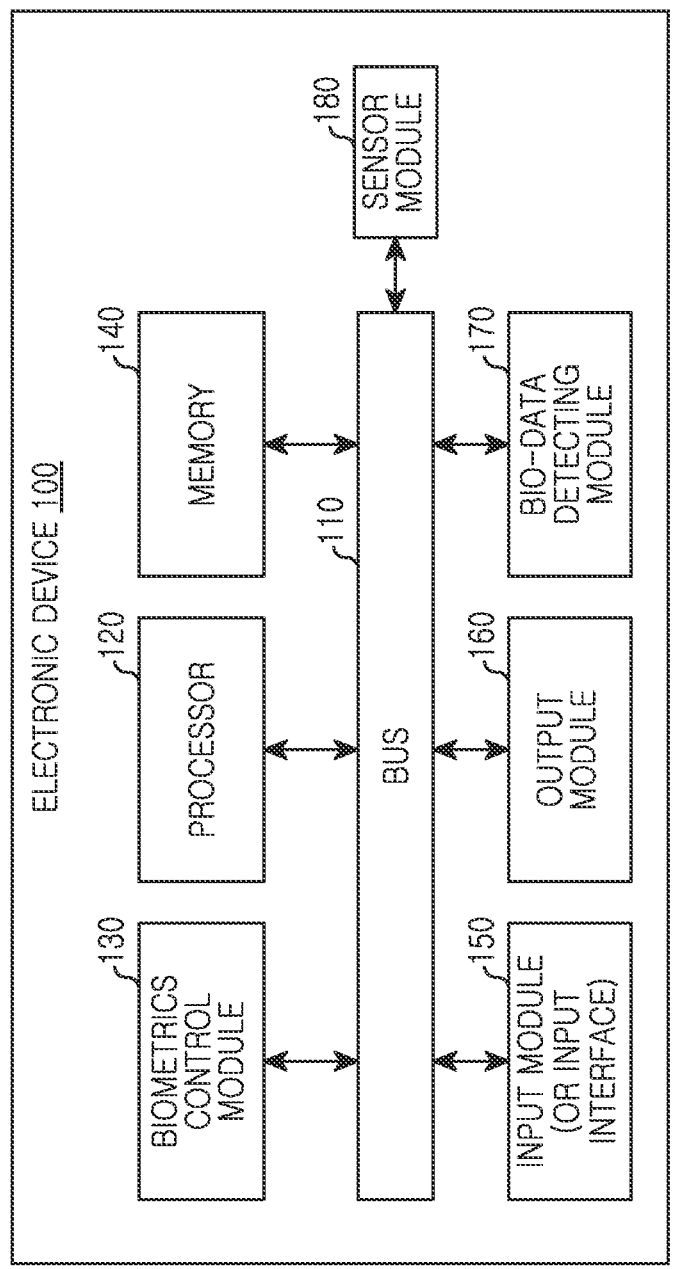
FIG. 1 is a block diagram illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described hereinafter relate to a technique for recognizing bio-data in an electronic device.

Hereinafter, an electronic device according to an embodiment of the present disclosure may be a device including a bio-data detecting module. For example, the electronic device may be one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG-1 or MPEG-2) Audio Layer 3 (MP3) player, a mobile medical device, an electronic bracelet, an electronic necklace, an electronic appcessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, and the like), various medical devices (e.g., Magnetic Resonance Angiography (MRA), Magnetic Resonance Imaging (MRI), Computed Tomography (CR), imaging equipment, ultrasonic instrument, and the like), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a vessel navigation device, a gyro compass, and the like), avionics, a security device, an electronic costume, an electronic key, a camcorder, game consoles, a Head-Mounted Display (HMD), a flat panel display device, an electronic album, a furniture or a part of building/constructions including a communication function, an electronic board, an electronic signature receiving device, a projector, and the like. It is apparent to those ordinarily skilled in the art that the electronic device according to the present disclosure is not limited to the aforementioned devices.

In an embodiment of the present disclosure described hereinafter, bio-data may include at least one of a user's fingerprint, face, voice, retina, and iris.

FIG. 1 is a block diagram illustrating an electronic device according to various embodiments of the present disclosure.

Referring to FIG. 1, an electronic device 100 may include a bus 110, a processor 120, a biometrics control module 130, a memory 140, an input module (or an input interface) 150, an output module 160, a bio-data detecting module 170, and a sensor module 180, but is not limited thereto. Herein, the processor 120 and/or the memory 140 may be present plural in number.

The bus 110 may connect the aforementioned constitutional elements included in the electronic device 100 and may control communication between the aforementioned constitutional elements included in the electronic device 100.

The processor 120 may control the electronic device 100 to provide various services. For example, the processor 120 may interpret an instruction received from one or more different constitutional elements (e.g., the biometrics control module 130, the memory 140, the input module 150, the output module 160, the bio-data detecting module 170, and the sensor module 180) included in the electronic device 100 via the bus 110, and may perform an arithmetic or data processing operation based on the interpreted instruction.

The processor 120 may control the electronic device 100 to provide various services by executing one or more programs stored in the memory 140.

The biometrics control module 130 may provide guide information for bio-data detection by using sensing information detected using the sensor module 180. The biometrics control module 130 may provide the guide information for bio-data detection by using at least one of an image, an audio signal, a vibration, a tactile sensation, and a fragrance. For example, the biometrics control module 130 may provide the guide information for bio-data detection based on touch information detected using the sensor module 180. More specifically, if a fingerprint recognition sensor in the bio-data detecting module 170 is used to recognize a fingerprint is included in a home button disposed to a front portion of the electronic device 100, the biometrics control module 130 may determine at least a part of an area adjacent to the fingerprint recognition sensor in a touch detection area as a reference area. If a touch on the reference area is detected through the sensor module 180, the biometrics control module 130 may control to provide guide information for fingerprint recognition based on touch information on the reference area. Herein, the touch detection area is an area capable of detecting a touch input by using at least one touch sensor, and may be included in all or some parts of the output module 160. The touch information may include at least one of a touch area and a touch location.

For another example, the biometrics control module 130 may provide the guide information for bio-data detection based on motion information of the electronic device 100, which is detected using the sensor module 180. More specifically, the biometrics control module 130 may determine a reference motion of the electronic device 100 for the fingerprint recognition. The biometrics control module 130 may provide the guide information for fingerprint recognition by comparing the reference motion of the electronic device 100 with the motion information of the electronic device 100, which is detected using the sensor module 180 (e.g., an acceleration sensor (not illustrated), an image sensor (not illustrated), a grip sensor (not illustrated), a gyro sensor (not illustrated)). For example, the biometrics control module 130 may identify a predetermined reference motion or may determine the reference motion of the electronic device 100 for the fingerprint recognition based on a fingerprint recognition rate corresponding to the motion information (e.g., tilt) of the electronic device 100.

For another example, the biometrics control module 130 may provide the guide information for bio-data detection based on user's motion information detected by using the sensor module 180. More specifically, the biometrics control module 130 may determine a user's reference motion for iris recognition. The biometrics control module 130 may provide state information for iris recognition by comparing the user's reference motion and the user's motion information detected by using the sensor module 180 (e.g., an acceleration sensor, an image sensor, a proximity sensor, and a gyro sensor). For example, the biometrics control module 130 may identify a predetermined user's reference motion or may determine a user's reference motion for iris recognition based on an iris recognition rate corresponding to the user's motion information. Herein, the user's motion information may include at least one of a distance between the electronic device 100 and the user and an angle between the electronic device 100 and the user.

For example, the biometrics control module 130 may provide the guide information for bio-data detection based on user contact information detected by using the sensor module 180. More specifically, if a fingerprint recognition area using the fingerprint recognition sensor overlaps with at least a part of a contact recognition area capable of detecting the user contact information by using the sensor module 180, the biometrics control module 130 may detect the user's contact information for fingerprint recognition by using the sensor module 180. The biometrics control module 130 may provide the guide information for fingerprint recognition based on strength of a fingerprint area detected from the fingerprint recognition area by using the sensor module 180.

The memory 140 may store an instruction or data received from one or more constitutional elements (e.g., the processor 120, the biometrics control module 130, the input module 150, the output module 160, the bio-data detecting module 170, and the sensor module 180) included in the electronic device 100 or generated by the one or more constitutional elements.

The memory 140 may store one or more programs executed in at least one of the processor 120 and the biometrics control module 130 to provide a service of the electronic device 100.

The input module (or the input interface) 150 may transmit an instruction or data generated by a user's selection to the processor 120 or the biometrics control module 130 or the memory 140 via the bus 110. For example, the input module 150 may include a keypad including at least one hardware button.

The output module 160 may output to an external element an instruction or data or state information received from one or more constitutional elements (i.e., the processor 120, the biometrics control module 130, the input module 150, the bio-data detecting module 170, and the sensor module 180) included in the electronic device 100 or generated by one or more constitutional elements. For example, the output module 160 may output the guide information for bio-data detection by using at least one of an image, an audio signal, a vibration, a tactile sensation, and a fragrance under the control of the biometrics control module 130. For example, the output module 160 may include at least one module capable of outputting information to an external element such as a display module (e.g., a display (not illustrated)), an audio output module (e.g., a speaker), and a vibration module.

The output module 160 may display an image, video, or data to a user. For example, the output module 160 (e.g., the display) may display application information driven by the processor 120. For another example, the output module 160 may display the guide information for bio-data detection under the control of the biometrics control module 130.

The bio-data detecting module 170 may detect user's bio-data. For example, the bio-data detecting module 170 may include at least one of a fingerprint recognition sensor, an iris recognition sensor, a voice recognition sensor, a retina recognition sensor, and a blood vessel recognition sensor and thus may detect the user's bio-data.

The sensor module 180 may detect a motion of the electronic device 100 and user's motion information. For example, the sensor module 180 may include a touch sensor, a gyro sensor, an acceleration sensor, an image sensor, a proximity sensor, and a grip sensor and thus may detect the motion of the electronic device 100 and the user's motion information.

In an embodiment of the present disclosure, the bio-data detecting module 170 and the sensor module 180 may be configure in a combined one module. Also, the bio-data detecting module 170 and the sensor module 180 may be configured in a home button of the electronic device.

In an embodiment of the present disclosure, the bio-data detecting module 170 and the sensor module 180 may be configured as separate module, and be included in the home button or a portion of the touch screen of the electronic device, respectively.

The electronic device 100 may further include a communication module (or a communication interface) for connecting communication between the electronic device 100 and at least one different electronic device or server or at least one peripheral device. For example, a communication module may support a near-distance communication protocol (e.g., WiFi, Bluetooth (BT), Near Field Communication (NFC)), or a network communication protocol (e.g., Internet, Local Area Network (LAN), Wide Area Network (WAN), telecommunication network, cellular network, satellite network, Plain Old Telephone Service (POTS), and the like) or a wired communication protocol (e.g., Universal Serial Bus (USB), High Definition Multimedia Interface (HDMI)). In this case, the communication protocol (e.g., the near-distance communication protocol, the network communication protocol, the wired communication protocol) may be supported in a middleware or Application Programming Interface (API) of the memory 140. Herein, the different electronic device is a peripheral device of the electronic device 100, and may include the same or different type of the electronic device 100.

In the aforementioned embodiment of the present disclosure, the biometrics control module 130 may control to provide the guide information for bio-data detection in one module.

Figure 2:
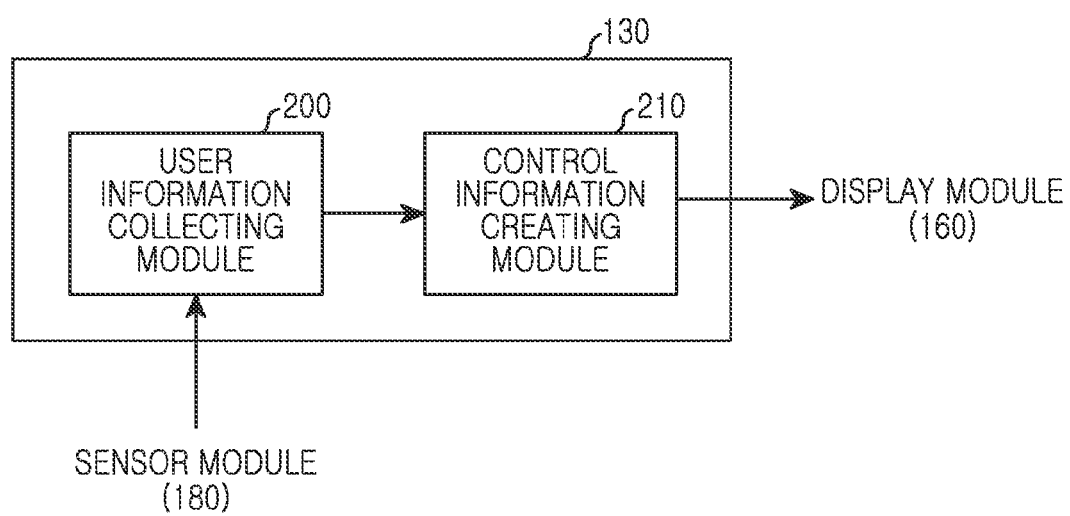
FIG. 2 is a block diagram illustrating a biometrics control module in detail according to an embodiment of the present disclosure.

In an embodiment of the present disclosure, the biometrics control module 130 may include separate hardware, software, or firmware modules or a combination thereof to control to provide the guide information for bio-data detection as shown in FIG. 2.

FIG. 2 is a block diagram illustrating a biometrics control module in detail according to an embodiment of the present disclosure.

Referring to FIG. 2, the biometrics control module 130 may include a user information collecting module 200 and a control information creating module 210.

The user information collecting module 200 may detect user's input information by collecting sensing information provided from the sensor module 180. Herein, the user's input information may include at least one of touch information, contact information or motion information of the electronic device 100. The contact information may include information regarding pressure strength of an area in contact with the electronic device 100.

The control information creating module 210 may provide guide information for bio-data detection by using user input information provided from the user information collecting module 200. The control information creating module 210 may provide the guide information for bio-data detection by using at least one of an image, an audio signal, a vibration, a tactile sensation, and a fragrance. For example, the control information creating module 210 may provide the guide information for bio-data detection based on touch information provided from the user information collecting module 200. For another example, the control information creating module 210 may provide the guide information for bio-data detection based on motion information of the electronic device 100, provided from the user information collecting module 200. For another example, the control information creating module 210 may provide the guide information for bio-data detection based on user's motion information provided from the user information collecting module 200. For another example, the control information creating module 210 may provide the guide information for bio-data detection based on user contact information provided from the user information collecting module 200.

In the aforementioned embodiment of the present disclosure, the electronic device 100 may control to provide the guide information for bio-data detection by using the biometrics control module 130.

In an embodiment of the present disclosure, the electronic device 100 may control to provide the guide information for bio-data detection by using the processor 120.

Figure 3:
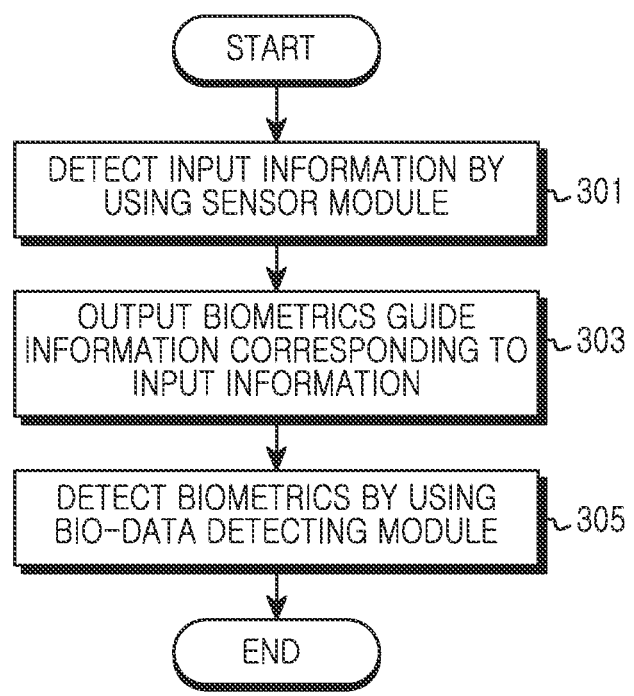
FIG. 3 illustrates a procedure for providing biometrics guide information in an electronic device according to an embodiment of the present disclosure.

FIG. 3 illustrates a procedure for providing biometrics guide information in an electronic device according to an embodiment of the present disclosure.

Referring to FIG. 3, the electronic device 100 may detect input information by using the sensor module 180 in operation 301. For example, the electronic device 100 may detect touch information by using a touch sensor. For another example, the electronic device 100 may detect motion information of the electronic device 100 by using at least one of an acceleration sensor, an image sensor, a grip sensor, and a gyro sensor. For another example, the electronic device 100 may detect user's motion information by using at least one of the acceleration sensor, the image sensor, the grip sensor, and the gyro sensor. For another example, the electronic device 100 may detect pressure strength of an area in contact with a user by using a pressure sensor.

The electronic device 100 may output biometrics guide information corresponding to input information in operation 303. For example, the electronic device 100 may output guide information for guiding to adjust at least one of a location and angle of the electronic device 100 in association with the input information to increase a recognition rate of bio-data. For another example, the electronic device 100 may output guide information for guiding to modify at least one of a location and posture of a user in association with the input information to increase the recognition rate of the bio-data. For another example, the electronic device 100 may output expected recognition rate information of the bio-data in association with the input information.

The electronic device 100 may detect the bio-data of the user by using a bio-data detecting module in operation 305.

When the bio-data of the user is detected according to the aforementioned embodiment of the present disclosure, the electronic device 100 may provide a service corresponding to the bio-data of the user. For example, the electronic device 100 may set a security for content or the electronic device 100 by using the bio-data of the user or may cancel the security setting of the content or the electronic device 100.

Figure 4:
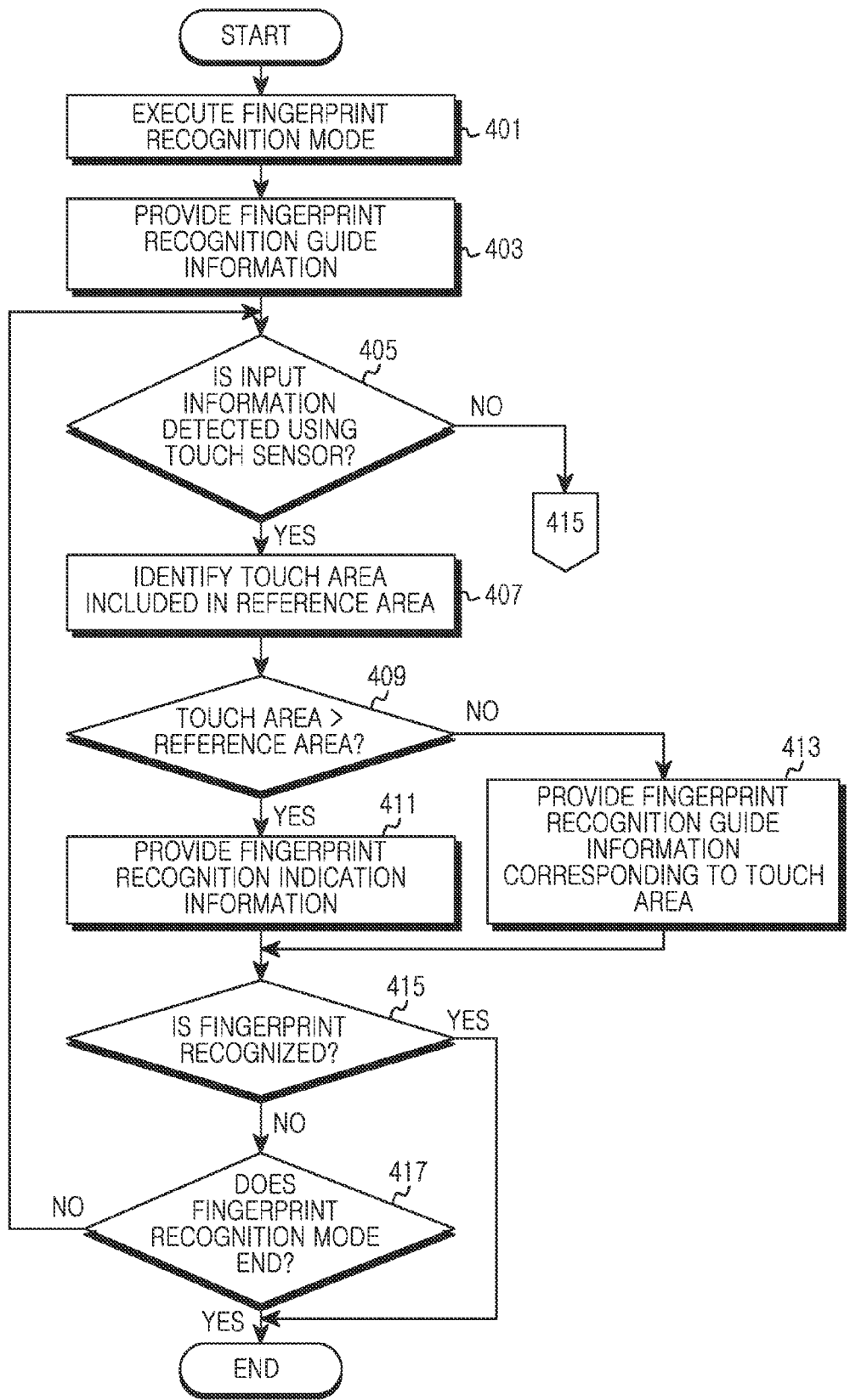
FIG. 4 illustrates a procedure for providing guide information for fingerprint recognition based on touch information in an electronic device according to an embodiment of the present disclosure.

FIG. 4 illustrates a procedure for providing guide information for fingerprint recognition based on touch information in an electronic device according to an embodiment of the present disclosure. The following description may be about a feature for providing the guide information for fingerprint recognition by using a screen configuration of FIGS. 5A to 5C.

Figure 5A:
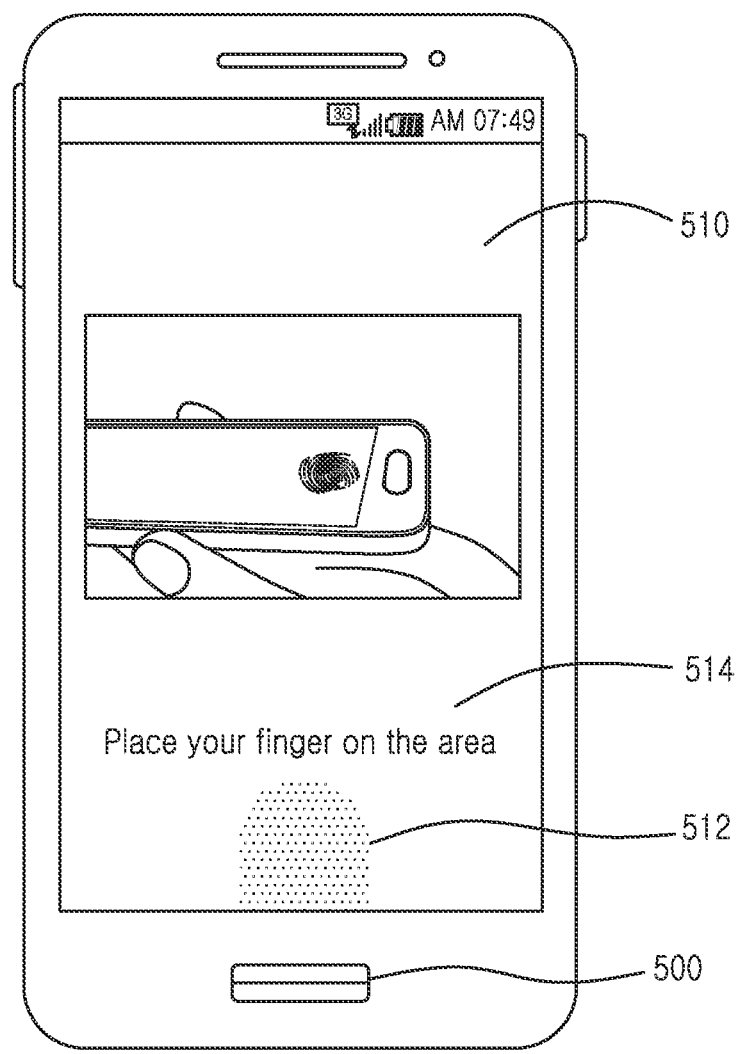
FIGS. 5A, 5B, and 5C illustrate a screen configuration of fingerprint recognition guide information according to various embodiments of the present disclosure.
Figure 5B:
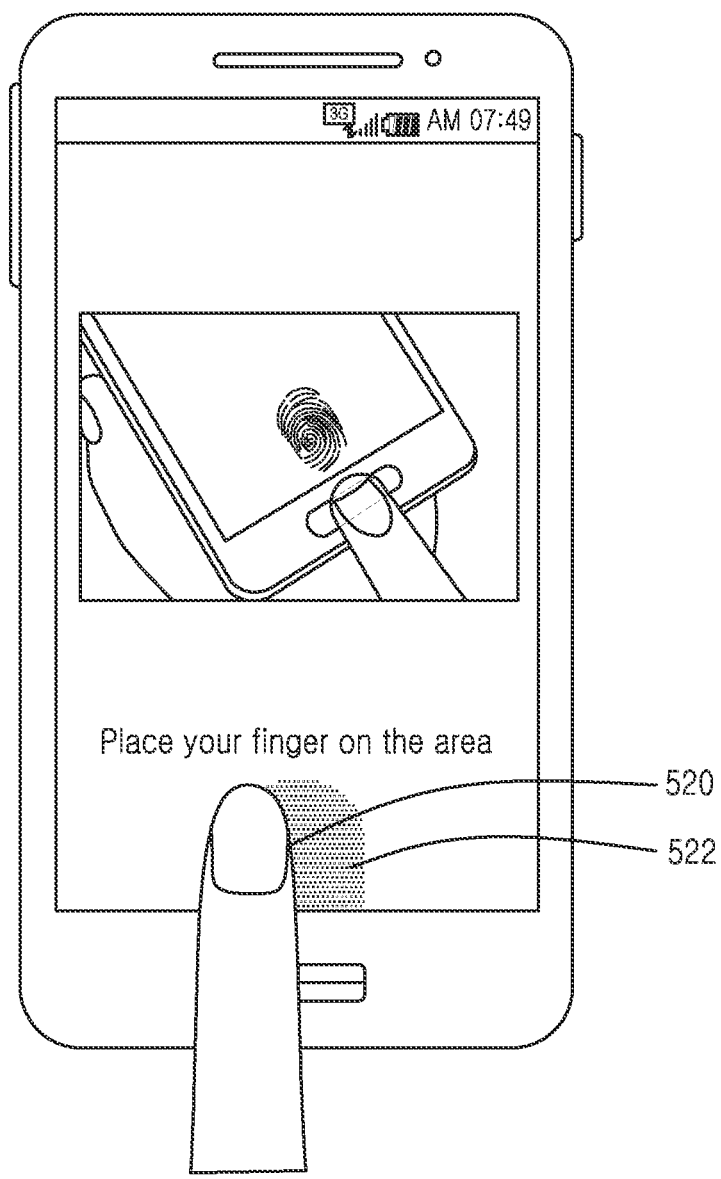
Figure 5C:
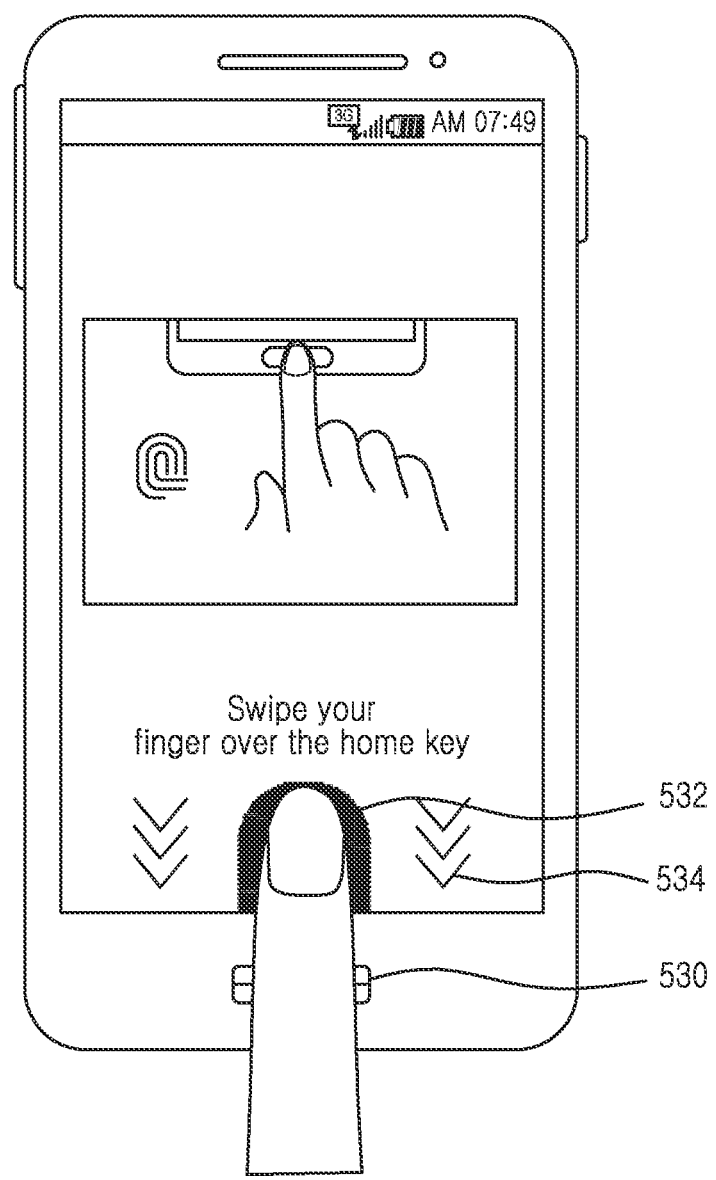

FIGS. 5A, 5B, and 5C illustrate a screen configuration of fingerprint recognition guide information according to various embodiments of the present disclosure.

Referring to FIG. 4, the electronic device 100 may execute a fingerprint recognition mode in operation 401. For example, the electronic device 100 may execute the fingerprint recognition mode based on input information detected using at least one of the input module 150 and the sensor module 180. For another example, the electronic device 100 may execute the fingerprint recognition mode in association with gesture information detected using the sensor module 180. Herein, the gesture information may include at least one of motion information of the electronic device 100 and motion information of the user, detected using the sensor module 180.

The electronic device 100 may display the guide information for fingerprint recognition to the output module 160 in operation 403.

Referring to FIG. 5A, the electronic device 100 may display to the output module 160 the guide information to show an image (or video) 510 indicating a fingerprint recognition means 514 and a virtual fingerprint recognition area 512 in which the fingerprint recognition may be attempted.

The electronic device 100 may identify whether input information (or touch information) is detected by using a touch sensor in operation 405.

If the input information is not detected by using the touch sensor in operation 405, the electronic device 100 may identify whether user's fingerprint information is detected in operation 415.

If the input information is detected by using the touch sensor in operation 405, the electronic device 100 may identify a touch area included in a reference area in operation 407. For example, as shown in FIG. 5A, if a fingerprint recognition sensor is included in a home button disposed to a front portion of the electronic device 100 (see button 500, the electronic device may determine at least a part of an area 512 adjacent to the fingerprint recognition sensor in a touch detection area as a reference area. The electronic device 100 may display the reference area as the virtual fingerprint detection area 512 as shown in FIG. 5A.

The electronic device 100 may identify whether the touch area included in the reference area is larger than the reference area in operation 409. Herein, the reference area may be set to a touch area capable of satisfying a reference touch recognition rate in association with a touch recognition rate corresponding to the touch area included in the reference area.

If the touch area included in the reference area is less than or equal to the reference area in operation 409, the electronic device 100 may provide fingerprint recognition guide information corresponding to the touch area in operation 413.

Referring to FIG. 5B, if a touch 520 is detected only in a part of the reference area, the electronic device 100 may change at least one of a graphic element (e.g., a color, a transparency, a shadow), audio signal, vibration, tactile sensation, and fragrance corresponding to the virtual fingerprint detection area 512 so as to be associated with the touch area included in the reference area 522. In addition, although not shown, the electronic device 100 may estimate a fingerprint recognition rate corresponding to the touch area 520 included in the reference area and may display it to the output module 160.

If the touch area included in the reference area is larger than the reference area in operation 409, the electronic device 100 may provide fingerprint recognition indication information in operation 411.

Referring to FIG. 5C, if a touch on the reference area 532 is detected, the electronic device 100 may change a graphic element (e.g., a color, a transparency, a shadow) of the virtual fingerprint detection area 512 so that the fingerprint recognition sensor 530 performs fingerprint recognition by moving a finger while maintaining a shape of the finger touching the reference area. In addition, the electronic device 100 may display to the output module 160 a motion direction 534 of the finger for the fingerprint recognition.

If the fingerprint recognition indication information is provided in operation 411 or if fingerprint recognition guide information corresponding to the touch area is provided in operation 413, the electronic device 100 may identify whether user's fingerprint information is detected in operation 415.

If the user's fingerprint information is detected in operation 415, the electronic device 100 may recognize that the fingerprint recognition is complete and then may end the present algorithm.

If the user's fingerprint information is not detected in operation 415, the electronic device 100 may identify whether the fingerprint recognition mode ends in operation 417. For example, the electronic device 100 may identify whether the fingerprint recognition mode ends based on input information detected through at least one of the input module 150 and the sensor module 180.

If the fingerprint recognition mode does not end in operation 417, the electronic device 100 may identify whether input information (or touch information) is detected by using the touch sensor in operation 405.

If the fingerprint recognition mode ends in operation 417, the electronic device 100 may end the present algorithm.

In the aforementioned embodiment of the present disclosure, the electronic device 100 may provide the fingerprint recognition guide information by using the touch information regarding the reference area detected through the touch sensor. In this case, the electronic device 100 may additionally provide the fingerprint recognition guide information corresponding to motion information of the electronic device 100, detected through the sensor module 180.

Figure 6A:
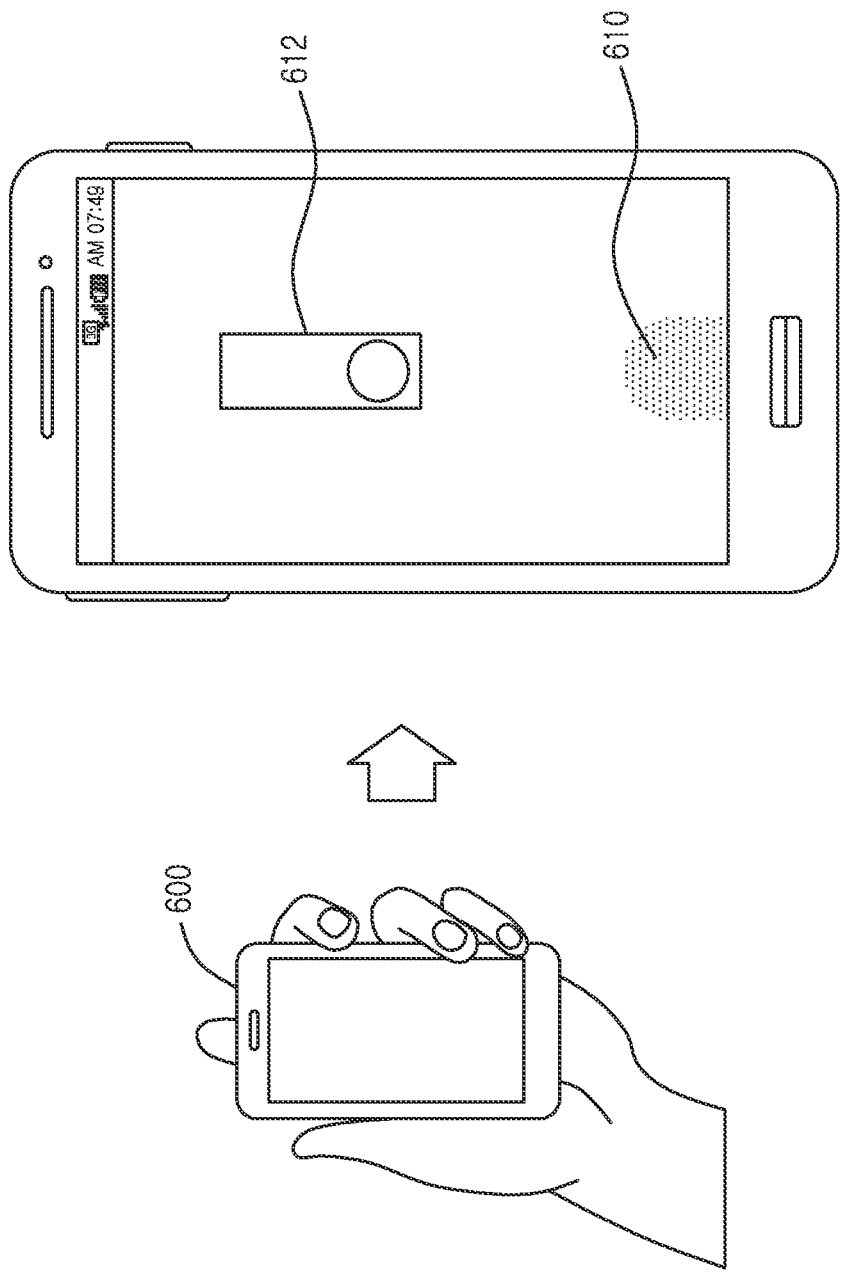
FIGS. 6A, 6B, and 6C illustrate a screen configuration of fingerprint recognition guide information including motion information of an electronic device according to various embodiments of the present disclosure.
Figure 6B:
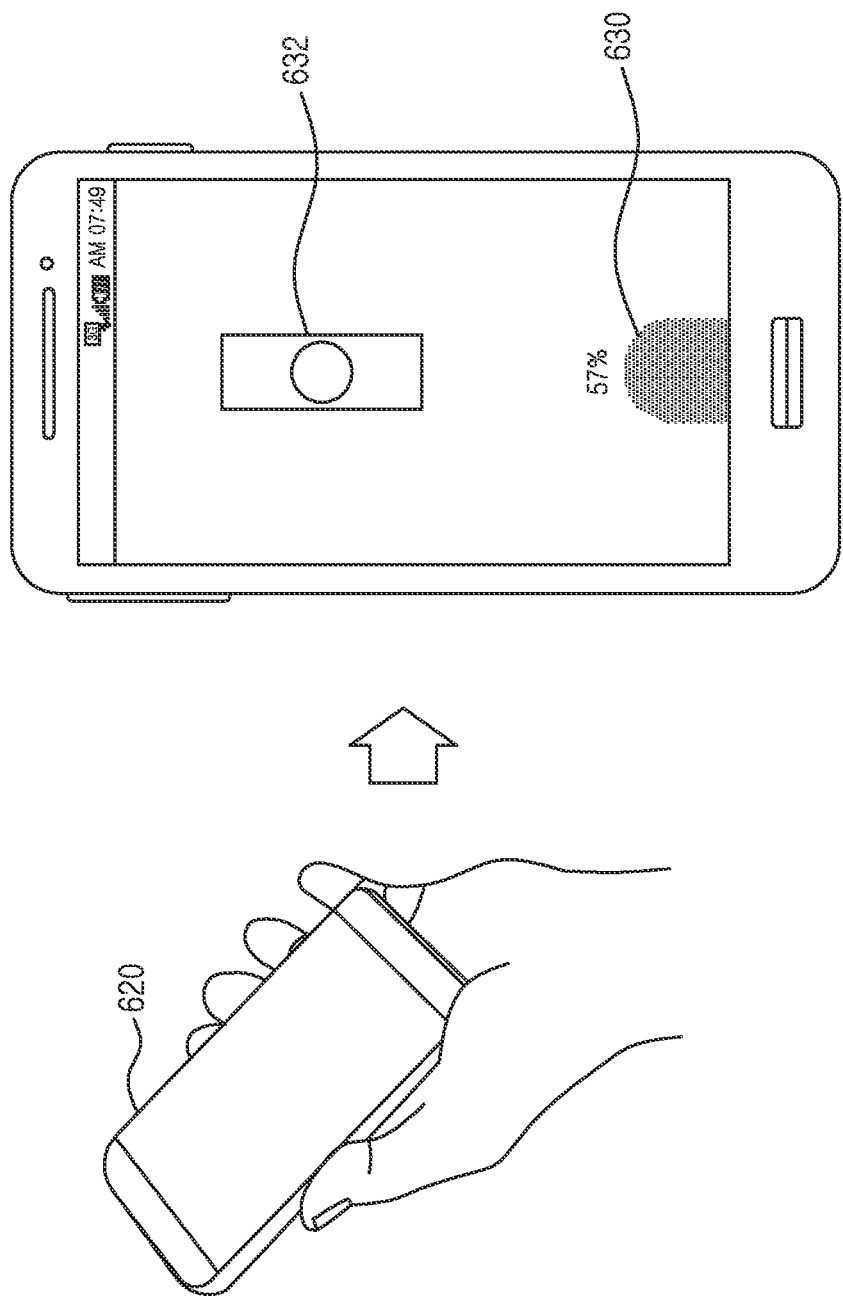
Figure 6C:
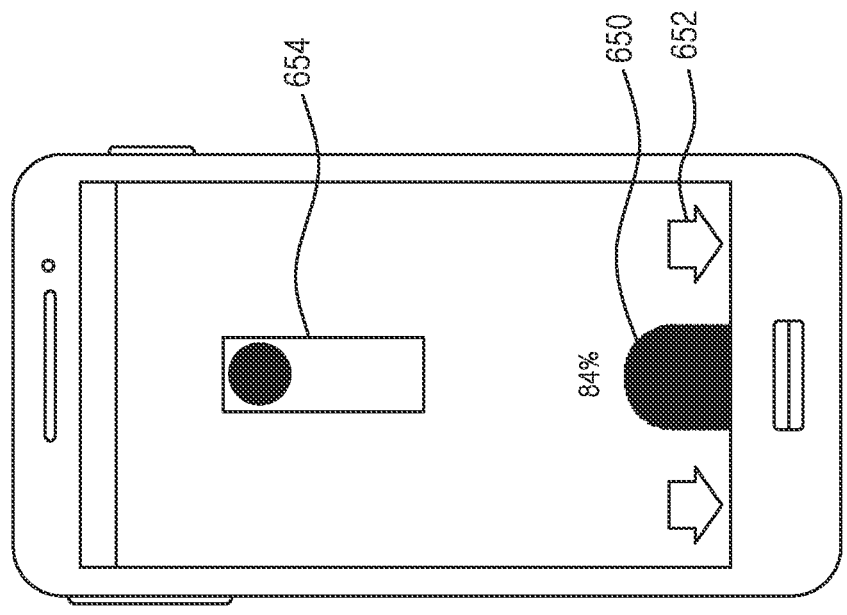
Figure 6C:
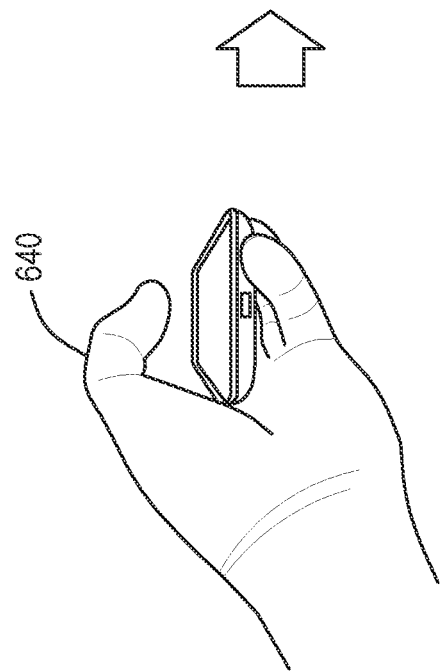

FIGS. 6A, 6B, and 6C illustrate a screen configuration of fingerprint recognition guide information including motion information of an electronic device according to various embodiments of the present disclosure.

If fingerprint recognition guide information corresponding to motion information of the electronic device 100 is provided additionally, the electronic device 100 may determine a reference motion of the electronic device 100 for fingerprint recognition. For example, the electronic device 100 may determine a motion of the electronic device 100 which is horizontal to the ground as the reference motion. In this case, the electronic device 100 may identify a predetermined reference motion or may determine the reference motion of the electronic device 100 for the fingerprint recognition based on a fingerprint recognition rate corresponding to the motion information (e.g., tilt) of the electronic device 100.

The electronic device 100 may compare the motion of the electronic device 100 and the reference motion and may display fingerprint recognition guide information corresponding to the motion of the electronic device 100 to the output module 160.

Referring to FIG. 6A, if the electronic device 100 is vertical to the ground 600 (e.g., a height direction of the electronic device), the electronic device 100 may recognize that the motion of the electronic device 100 is not suitable for the fingerprint recognition. Accordingly, the electronic device 100 may display to the output module 160 a fingerprint recognition guide image 612 for guiding the motion of the electronic device 100 to the reference motion by changing the image 610 according to the motion of the electronic device 100.

Referring to FIG. 6B, if the electronic device 100 has a tilt of 45° 620, the electronic device 100 may recognize that the motion of the electronic device 100 is not suitable for the fingerprint recognition. Accordingly, the electronic device 100 may display to the output module 160 a fingerprint recognition guide image 632 for guiding the motion of the electronic device 100 to the reference motion by changing the image 630 according to the motion of the electronic device 100.

Referring to FIG. 6C, if the electronic device 100 is horizontal to the ground 640, the electronic device 100 may recognize that the motion of the electronic device 100 is suitable for the fingerprint recognition. Accordingly, the electronic device 100 may display a guide image 654 for indicating the fingerprint recognition 650 in association with the motion 652 of the electronic device 100 into the output module 160.

Figure 7:
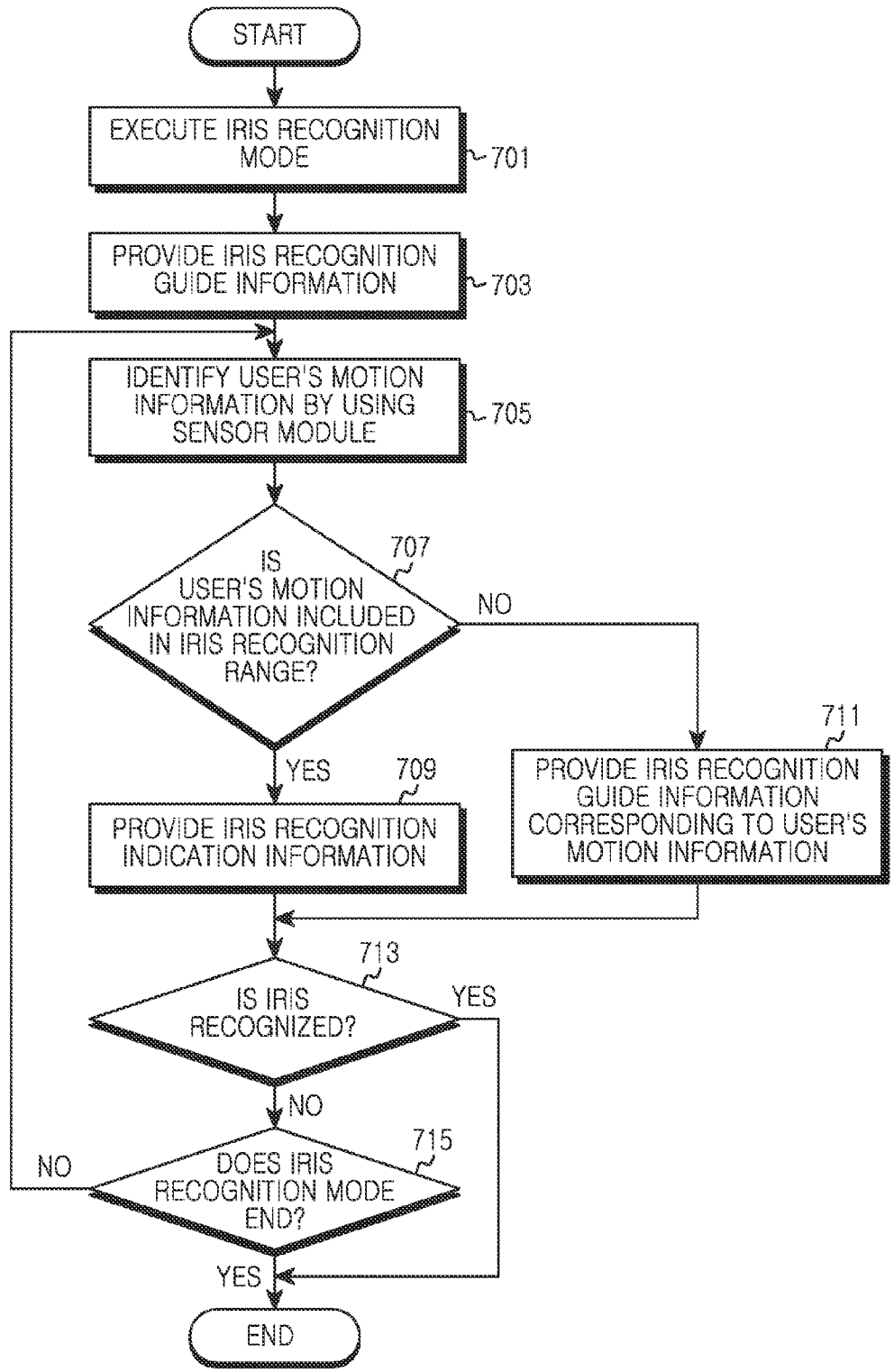
FIG. 7 illustrates a procedure for providing guide information for iris recognition based on user state information in an electronic device according to an embodiment of the present disclosure.

FIG. 7 illustrates a procedure for providing guide information for iris recognition based on user state information in an electronic device according to an embodiment of the present disclosure. The following description may be about a feature for providing the guide information for iris recognition by using a screen configuration of FIGS. 8A to 8C.

Figure 8A:
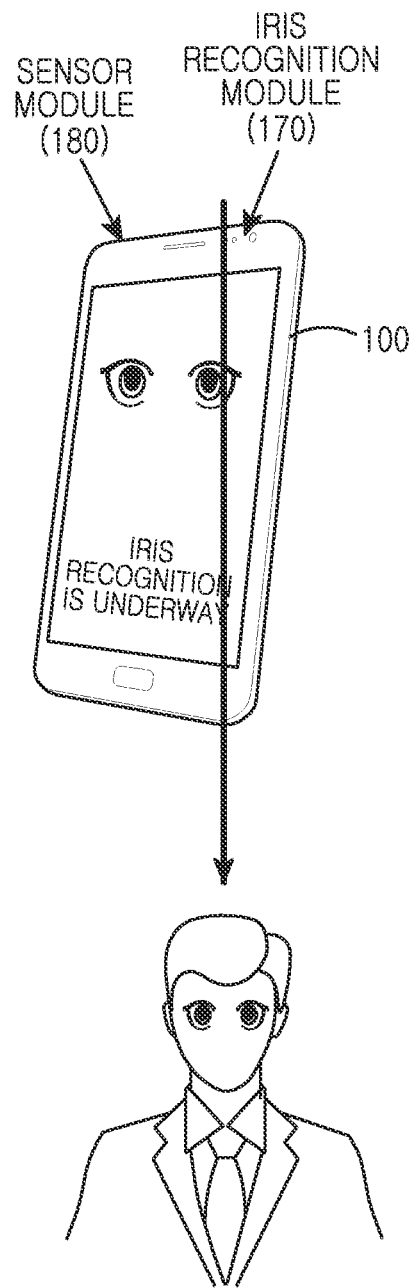
FIGS. 8A, 8B, and 8C illustrate a screen configuration of iris recognition guide information according to various embodiments of the present disclosure.
Figure 8B:
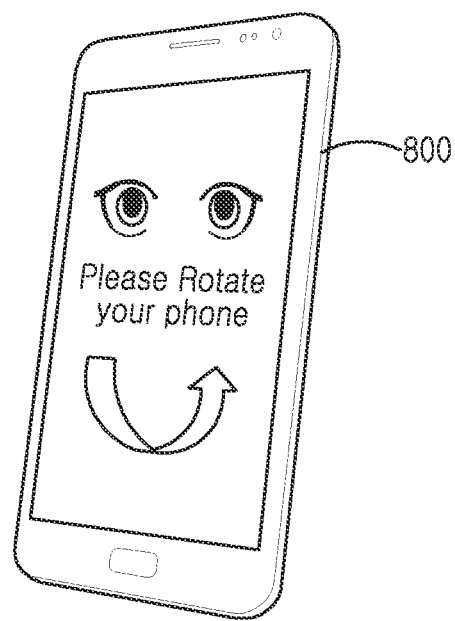
Figure 8C:
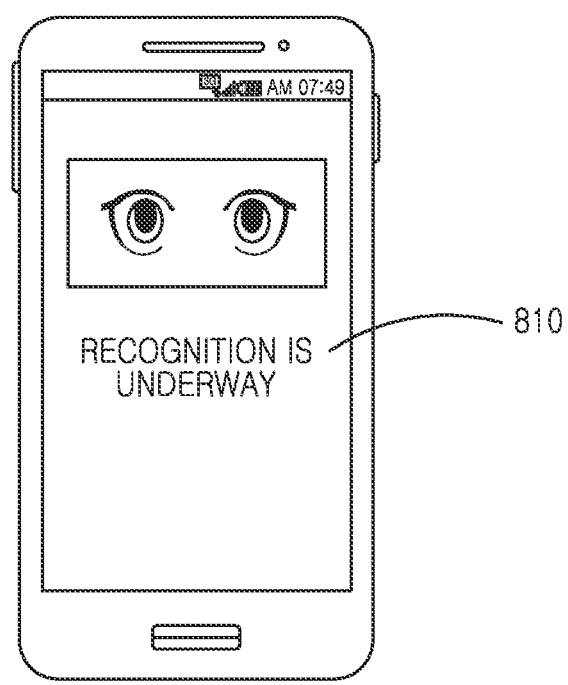

FIGS. 8A, 8B, and 8C illustrate a screen configuration of iris recognition guide information according to various embodiments of the present disclosure.

Referring to FIG. 7, the electronic device 100 may execute an iris recognition mode in operation 701. For example, the electronic device 100 may execute the iris recognition mode based on input information detected using at least one of the input module 150 and the sensor module 180. For another example, the electronic device 100 may execute the iris recognition mode in association with gesture information detected using the sensor module 180.

The electronic device 100 may display the guide information for iris recognition to the output module 160 in operation 703.

The electronic device 100 may detect user's motion information by using the sensor module in operation 705.

Referring to FIG. 8A, the electronic device 100 may detect at least one of a distance between the electronic device 100 and the user and an angle between the electronic device 100 and the user by using the sensor module 180 (e.g., an image sensor).

In operation 707, the electronic device 100 may identify whether the user's motion information is included in an iris recognition range.

If the user's motion information is not included in the iris recognition range in operation 707, the electronic device 100 may provide iris recognition guide information corresponding to the user's motion information in operation 711.

Referring to FIG. 8B, the electronic device 100 may display guide information 800 for guiding to adjust at least one of a location and angle of the electronic device 100 in association with the user's motion information to the output module 160. For another example, the electronic device 100 may display guide information for guiding to change at least one of a location and posture of a user in association with the user's motion information to the output module 160.

In operation 713, the electronic device 100 may identify whether user's iris information is detected.

If the user's motion information is included in the iris recognition range in operation 707, the electronic device 100 may provide iris recognition indication information in operation 709.

Referring to FIG. 8C, the electronic device 100 may display iris recognition indication information 810 to the output module 160 to indicate that iris recognition is currently underway.

In operation 713, the electronic device 100 may identify whether the user's iris information is detected.

If the user's iris information is detected in operation 713, the electronic device 100 may recognize that the iris recognition is complete and may end the present algorithm.

If the user's iris information is not detected in operation 713, the electronic device 100 may identify whether the iris recognition mode ends in operation 715. For example, the electronic device 100 may identify whether the iris recognition mode ends based on input information detected through at least one of the input module 150 and the sensor module 180.

If the iris recognition mode does not end in operation 715, returning to operation 705, the electronic device 100 may detect user's motion information by using the sensor module 180.

If the iris recognition mode ends in operation 715, the electronic device 100 may end the present algorithm.

Figure 9:
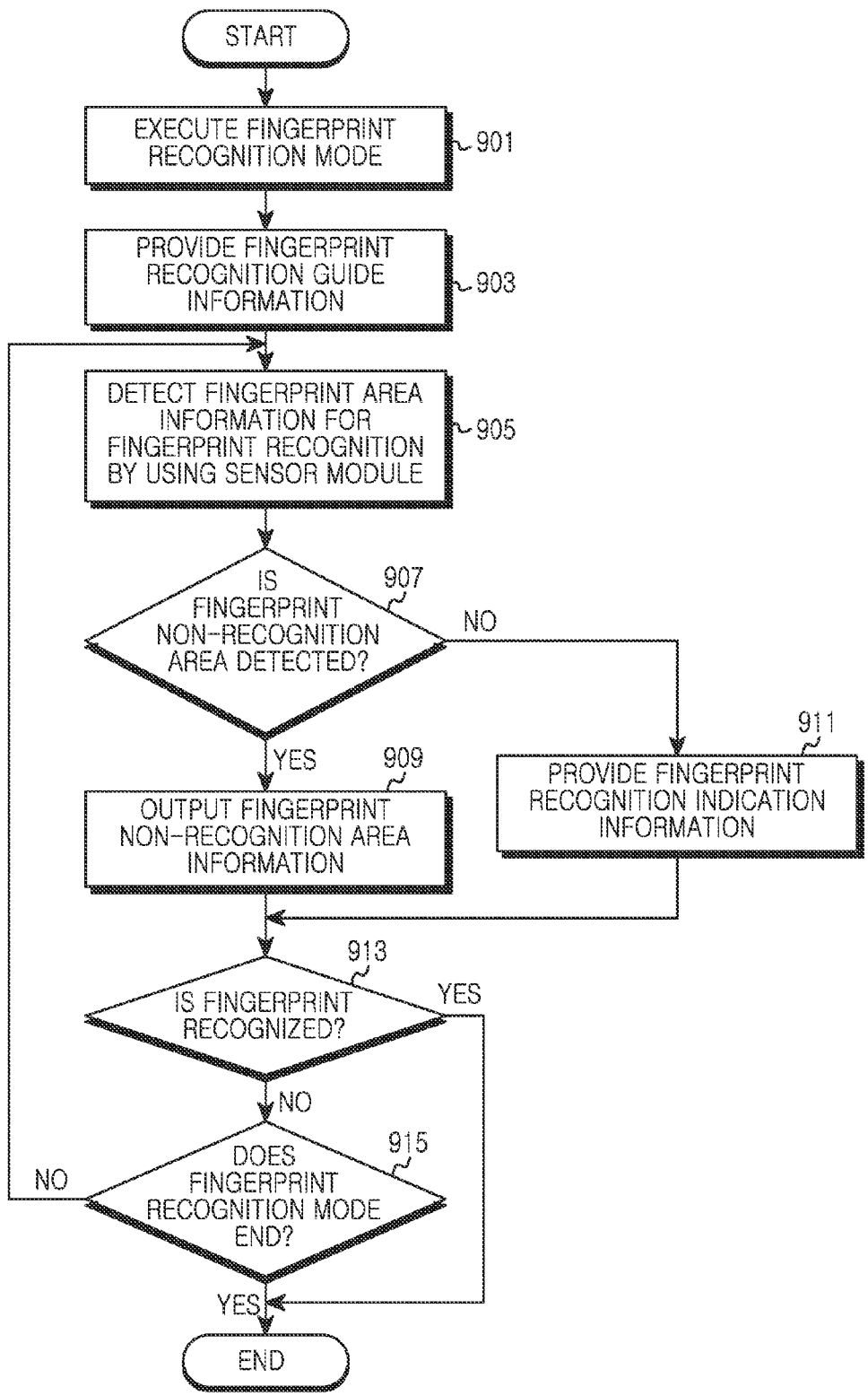
FIG. 9 illustrates a procedure for providing guide information for fingerprint recognition based on fingerprint recognition area information in an electronic device according to an embodiment of the present disclosure.

FIG. 9 illustrates a procedure for providing guide information for fingerprint recognition based on fingerprint recognition area information in an electronic device according to an embodiment of the present disclosure. The following description may be about a feature for providing the guide information for fingerprint recognition by using a screen configuration of FIGS. 10A and 10B.

Figure 10A:
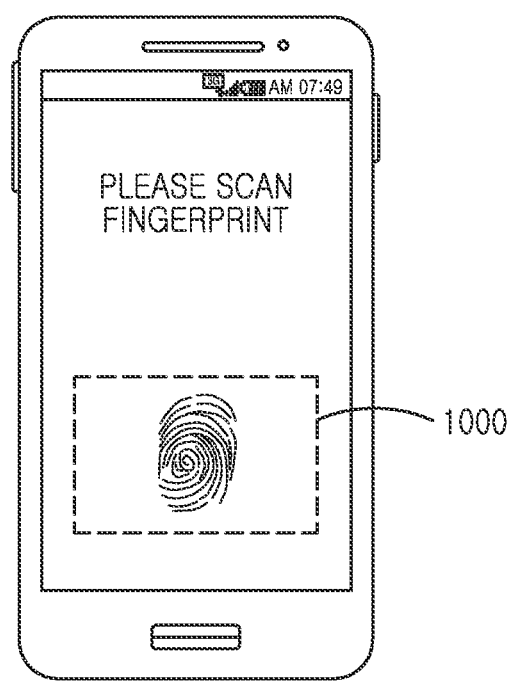
FIGS. 10A and 10B illustrate a screen configuration of fingerprint recognition guide information according to various embodiments of the present disclosure.
Figure 10B:
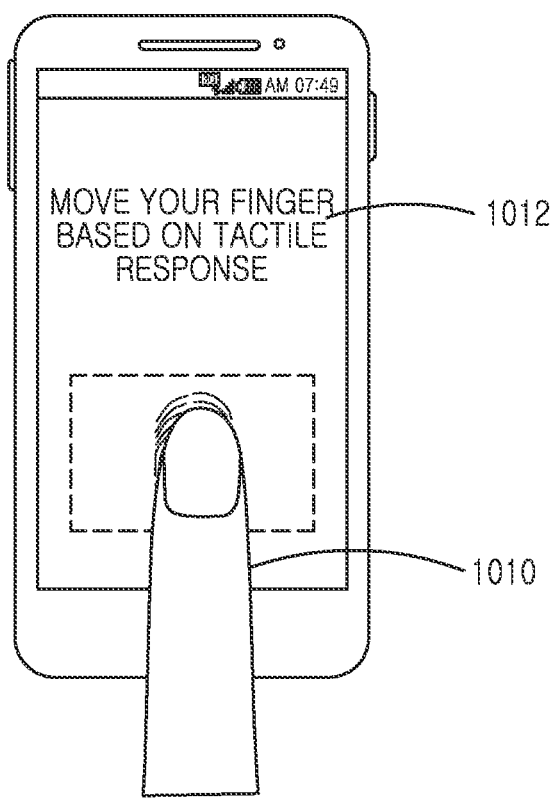

FIGS. 10A and 10B illustrate a screen configuration of fingerprint recognition guide information according to various embodiments of the present disclosure.

Referring to FIG. 9, the electronic device 100 may execute a fingerprint recognition mode in operation 901.

The electronic device 100 may display the guide information for fingerprint recognition to the output module 160 in operation 903.

Referring to FIG. 10A, the electronic device 100 may display to the output module 160 the guide information to show a fingerprint recognition area 1000.

In operation 905, the electronic device 100 may detect contact information of a fingerprint area in contact with a fingerprint recognition sensor for the fingerprint recognition.

Referring to FIG. 10B, upon detection of a user's contact 1010 for the fingerprint recognition, the electronic device 100 may detect pressure strength of the area which is in contact with the user by using a pressure sensor.

In operation 907, the electronic device 100 may identify whether a fingerprint non-recognition area is included in the fingerprint area. Herein, the fingerprint non-recognition area may indicate at least a part of an area included in the fingerprint recognition area 1000 and recognized as not being able to perform the fingerprint recognition because contact pressure strength is lower than reference strength.

If the fingerprint non-recognition area is included in the fingerprint area in operation 907, the electronic device may output state information on the fingerprint non-recognition area in operation 909. For example, the electronic device may generate a vibration in the fingerprint non-recognition area 1012. For another example, the electronic device may display a graphic element of the fingerprint non-recognition area by modifying the graphic element.

If the fingerprint non-recognition area is not included in the fingerprint area in operation 907, the electronic device 100 may provide fingerprint recognition indication information in operation 911. For example, the electronic device may display the fingerprint recognition indication information to the output module 160 so that a user maintains a contact on the fingerprint recognition area 1000.

If state information on the fingerprint non-recognition area is output in operation 909 or if the fingerprint recognition indication information is provided in operation 911, the electronic device 100 may identify whether the fingerprint information of the user is detected in operation 913.

If the fingerprint information of the user is detected in operation 913, the electronic device 100 may recognize that the fingerprint recognition is complete and may end the present algorithm.

If the fingerprint information of the user is not detected in operation 913, the electronic device 100 may identify whether the fingerprint recognition mode ends in operation 915.

If the fingerprint recognition mode does not end in operation 915, returning to operation 905, the electronic device 100 may detect contact information of the fingerprint area in contact with the fingerprint recognition sensor for the fingerprint recognition.

If the fingerprint recognition mode ends in operation 915, the electronic device 100 may end the present algorithm.

A term "module" used in the present document may imply a unit including, for example, one of hardware, software, and firmware or a combination of two or more of them. The "module" may be interchangeably used with a term such as a unit, a logic, a logical block, a component, a circuit, and the like. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure may include at least one of an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or method (e.g., operations) according to various embodiments of the present disclosure may be implemented with an instruction stored in a computer-readable storage media for example. If the instruction is executed by one or more processors (e.g., the processor 120), the one or more processors may perform a function corresponding to the instruction. The computer-readable storage media may be, for example, the memory 140.

The computer readable recording medium may be a hardware device configured particularly to store and perform a program instruction (e.g., program module), for example, a hard disk, a magnetic medium such as a floppy disc and a magnetic tape, an optical storage medium such as a Compact Disc-Read Only Memory (CD-ROM) or a DVD, a magnetic-optic medium such as a floptical disc, a ROM, a Random Access Memory (RAM), a flash memory, and the like. An example of the program instruction includes not only a machine language created by a compiler but also a high-level language executable by a computer by using an interpreter or the like. The aforementioned hardware device may be configured to operate as one or more software modules to perform the operation of the present disclosure, and the other way around is also possible.

The module or programming module according to various embodiments of the present disclosure may further include at least one or more constitutional elements among the aforementioned constitutional elements, or may omit some of them, or may further include additional other constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

As described above, since an electronic device provides a user with a bio-data recognition means on based user input information detected by using a bio-data detecting sensor and at least one different sensor, a bio-data recognition rate may be increased.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
    displaying a reference area and a first guide message for requesting a touch input on the reference area on a screen of the electronic device;
    detecting the touch input on the reference area using a touch sensor of the electronic device;
    determining whether size of a touched area is larger than size of the reference area;
    in response to determining that the size of the touched area is larger than the size of the reference area, displaying a second guide message for requesting to move the touch input from the reference area to a fingerprint sensor; and
    in response to determining that the size of the touched area is smaller than the size of the reference area or equal to the size of the reference area, transforming a graphic element of the reference area.

2. The method of claim 1, wherein the electronic device includes at least one of a gyro sensor, an acceleration sensor, an image sensor, a proximity sensor, and a grip sensor.

3. The method of claim 1, further comprising:
    displaying information related to a bio-data recognition corresponding to the touch input detected by using at least one of an image, an audio signal, a vibration, a tactile sensation, and a fragrance.

4. The method of claim 1, wherein the transforming the graphic element of the reference area comprises transforming at least one of a color, a transparency, a shadow of the reference area.

5. The method of claim 1, further comprising:
    displaying information in association with the tilt of the electronic device upon detecting a tilt of the electronic device.

6. The method of claim 1, further comprising:
    displaying, in association with the detected touch input, information for a bio-data recognition containing at least one of modification information for a location and/or angle of the electronic device, modification information on a location and posture of the user, and information indicating a start of the bio-data recognition.

7. An electronic device comprising:
    a sensor; and
    at least one processor configured to:
        display a reference area and a first guide message for requesting a touch input on the reference area on a screen of the electronic device;
        detect a touch input on the reference area using a touch sensor of the electronic device;
        determine whether size of a touched area is larger than a size of the reference area;
        in response to determining that the size of the touched area is larger than the size of the reference area, display a second guide message for requesting to move the touch input from the reference area to a fingerprint sensor; and
        in response to determining that the size of the touched area is smaller than the size of the reference area or equal to the reference area, transform a graphic element of the reference area.

8. The electronic device of claim 7, wherein the sensor includes at least one of a gyro sensor, an acceleration sensor, an image sensor, a proximity sensor, and a grip sensor.

9. The electronic device of claim 7, wherein the at least one processor is further configured to display information related to a bio-data recognition corresponding to the touch input detected by using at least one of an image, an audio signal, a vibration, a tactile sensation, and a fragrance.

10. The electronic device of claim 7, wherein the at least one processor is configured to transform at least one of a color, a transparency, and a shadow of the reference area.

11. The electronic device of claim 7, wherein the at least one processor is further configured to:
    detect a tilt of the electronic device by using the sensor, and
    display information in association with the tilt of the electronic device.

12. The electronic device of claim 7, wherein, the at least one processor, in association with the input detected by using the sensor, is further configured to display information for a bio-data recognition comprising at least one of modification information for a location and/or angle of the electronic device, modification information on a location and posture of the user, and information indicating a start of the bio-data recognition.

13. The electronic device of claim 7, wherein the at least one processor is further configured to detect at least one bio-data among a fingerprint, an iris, a voice, a retina, and a blood vessel.

* * * * *